(12) United States Patent
O'Hara

(10) Patent No.: US 11,558,266 B2
(45) Date of Patent: Jan. 17, 2023

(54) SCORING NETWORK TRAFFIC SERVICE REQUESTS USING RESPONSE TIME METRICS

(71) Applicant: Arbor Networks, Inc., Westford, MA (US)

(72) Inventor: Sean O'Hara, Ypsilanti, MI (US)

(73) Assignee: Arbor Networks, Inc., Westford, MA (US)

( * ) Notice: Subject to any disclaimer, the term of this patent is extended or adjusted under 35 U.S.C. 154(b) by 266 days.

(21) Appl. No.: 16/717,712

(22) Filed: Dec. 17, 2019

(65) Prior Publication Data

US 2021/0184946 A1 Jun. 17, 2021

(51) Int. Cl.
*H04L 43/04* (2022.01)
*G06N 20/00* (2019.01)
*H04L 67/60* (2022.01)

(52) U.S. Cl.
CPC ............. *H04L 43/04* (2013.01); *G06N 20/00* (2019.01); *H04L 67/60* (2022.05)

(58) Field of Classification Search
None
See application file for complete search history.

(56) References Cited

U.S. PATENT DOCUMENTS

| 10,515,096 B1* | 12/2019 | Choudhary | ........... G06F 40/174 |
| 10,915,579 B1* | 2/2021 | Bhide | ........... H04L 43/04 |
| 2016/0028762 A1* | 1/2016 | Di Pietro | ........... H04L 63/1416 726/23 |
| 2016/0065611 A1* | 3/2016 | Fakeri-Tabrizi | .... H04L 63/1441 726/23 |
| 2016/0218951 A1* | 7/2016 | Vasseur | ........... H04L 43/022 |
| 2016/0352766 A1* | 12/2016 | Flacher | ........... H04L 67/10 |
| 2017/0279698 A1* | 9/2017 | Sartran | ........... H04L 41/142 |
| 2017/0279835 A1* | 9/2017 | Di Pietro | ........... H04L 43/024 |
| 2017/0279838 A1* | 9/2017 | Dasgupta | ........... H04L 63/145 |
| 2017/0316342 A1* | 11/2017 | Franc | ........... G06N 20/10 |
| 2017/0318043 A1* | 11/2017 | Shin | ........... G06F 21/552 |
| 2017/0339029 A1* | 11/2017 | Bingham | ........... H04L 41/12 |
| 2018/0054457 A1* | 2/2018 | Fakeri-Tabrizi | .... H04L 63/1425 |
| 2018/0075134 A1* | 3/2018 | Fletcher | ........... G06F 16/903 |
| 2018/0337836 A1* | 11/2018 | Balabine | ........... H04L 63/1458 |
| 2019/0020663 A1* | 1/2019 | Bartos | ........... H04L 67/42 |
| 2019/0361864 A1* | 11/2019 | Rice | ........... G06F 16/23 |

(Continued)

*Primary Examiner* — Gregory B Sefcheck
*Assistant Examiner* — Suk Jin Kang
(74) *Attorney, Agent, or Firm* — Locke Lord LLP; Scott D. Wofsy; Christopher J. Capelli

(57) ABSTRACT

A method and system are provided for monitoring a protected network. The method includes, in a scoring phase, receiving a learned model having clusters of learning requests of learning network traffic observed during nonstrain operation of the protected network, wherein each cluster has an associated characteristic learning response time. The method further includes receiving a score request to score a network service request of the network traffic, classifying the network service request with one of the clusters by comparing fields of the network service request to fields used for clustering the learning requests with the cluster, calculating a score based on the characteristic learning response times generated for the learned cluster to which the network service request is classified, and adjusting supportive handling of the network service request based on the score.

20 Claims, 4 Drawing Sheets

(56) References Cited

U.S. PATENT DOCUMENTS

| | | | | |
|---|---|---|---|---|
| 2019/0372827 | A1* | 12/2019 | Vasseur | H04L 41/16 |
| 2020/0151204 | A1* | 5/2020 | Fletcher | G06F 3/04842 |
| 2020/0195669 | A1* | 6/2020 | Karasaridis | G06N 20/00 |
| 2020/0204569 | A1* | 6/2020 | Komarek | G06K 9/6269 |
| 2020/0228554 | A1* | 7/2020 | Balabine | H04L 63/1416 |
| 2020/0313986 | A1* | 10/2020 | Yadav | H04L 41/046 |
| 2020/0364338 | A1* | 11/2020 | Ducau | G06N 20/00 |
| 2020/0366717 | A1* | 11/2020 | Chaubey | H04L 63/0236 |
| 2021/0027170 | A1* | 1/2021 | Ye | G06N 3/08 |
| 2021/0058424 | A1* | 2/2021 | Chang | G06N 3/088 |
| 2021/0092132 | A1* | 3/2021 | Bhatia | H04L 63/1416 |
| 2021/0204152 | A1* | 7/2021 | Vasudevan | H04L 47/2441 |
| 2021/0342394 | A1* | 11/2021 | Fletcher | G06F 16/9535 |

* cited by examiner

SCORING NETWORK TRAFFIC SERVICE REQUESTS USING RESPONSE TIME METRICS

FIELD OF THE INVENTION

The present technology relates to a service provided to network traffic, and more particularly to scoring requests for the service using response time metrics.

BACKGROUND

Overview

Supports provided to a computer network can include supports such as mitigation, policy enforcement, and charge calculations. Such supports can be provided even when the network is experiencing strain.

Strain on a network can occur when traffic volume to or from a network is larger than a capacity of the network. Strain can be caused, for example, by distributed denial of service (DDOS) attacks, a malfunctioning component in the network, and/or a spike in network traffic volume due to high utilization of the network in a short period of time. Defensive techniques for distributed denial of service (DDOS) attacks typically use deep packet inspection (DPI) to analyze and classify traffic and then blackhole or block illegitimate traffic. This is done with the expectation that removing attack traffic from the network allows for services provided by the network to remain intact. The increasing sophistication of application layer attacks using well-formed requests challenges this expectation and ultimately leads to the dropping of legitimate traffic. Additionally, the DDOS attack itself or the response to the DDOS attack could result in the network becoming unable to provide service.

The effectiveness of the supports can be compromised when applied in the same way, regardless of whether the network is experiencing strain.

Such conventional methods and systems for providing supports to networks have generally been considered satisfactory for their intended purpose. However, there is still a need in the art for a method to take strain of a network into consideration when applying supports to the network.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of monitoring a protected network. The method includes, in a scoring phase, receiving a learned model having clusters of learning requests of learning network traffic observed during non-strain operation of the protected network, wherein each cluster has an associated characteristic learning response time based on learning response times determined for learning requests and corresponding learning responses of the learning network traffic. The method further includes receiving a score request to score a network service request of the network traffic, wherein the network service request is associated with a network service provided to or from the protected network and the score request includes fields of the network service request. The method further includes classifying the network service request with one of the clusters by comparing the fields of the network service request to fields used for clustering the learning requests with the cluster, calculating a score based on the characteristic learning response times generated for the learned cluster to which the network service request is classified, and adjusting supportive handling of the network service request based on the score.

In one or more embodiments, the method can further include, in a learning phase during non-strain operation of the protected network, observing the learning network traffic, clustering the learning requests based on the respective learning requests' fields, associating one of the learning responses or lack of learning response to each corresponding learning request of the clusters, determining the learning response time for the respective learning responses, and determining the characteristic learning response time per cluster based on the learning response times of the learning responses that correspond to the learning requests associated with the cluster.

In one or more embodiments, the method can further include normalizing selected fields of each learning request before clustering the learning requests using the normalized selected fields and normalizing the fields of the network service request before classifying the network service request.

In one or more embodiments, the method can further include normalizing selected fields of each learning responses before clustering the learning requests using the normalized selected fields.

In one or more embodiments, the method can further include determining a maximum return time, wherein the selected fields of the learning requests and requests can be normalized using the maximum return time.

In one or more embodiments, the characteristic return time can be based on a statistical function determined using the response times associated with the cluster. The method can further include, in the learning phase, generating a learned histogram per cluster that represents behavior of the cluster with regard to learning response times over time and determining a percentile for at least one statistical value in each histogram. In the scoring phase, calculating the score can include determining a score that represents a percentile for a statistical value that is closest to the fields of the network service request.

In one or more embodiments, the supportive handling can include dropping or redirecting network service requests, and adjusting the supportive handling can include deciding whether to drop or redirect the network service request based on the score.

In one or more embodiments, the supportive handling can include applying policy or charges, and adjusting the supportive handling can include selecting application of policy or charges based on the score.

In accordance with another aspect of the disclosure, a network monitoring system is provided to monitor a protected network. The system includes a memory configured to store instructions and a processor disposed in communication with the memory. The processor upon execution of the instructions is configured to perform the operations of the method.

In accordance with a further aspect of the disclosure, a non-transitory computer readable storage medium is provided with one or more computer programs comprising instructions, which when executed by a computer system, causes the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
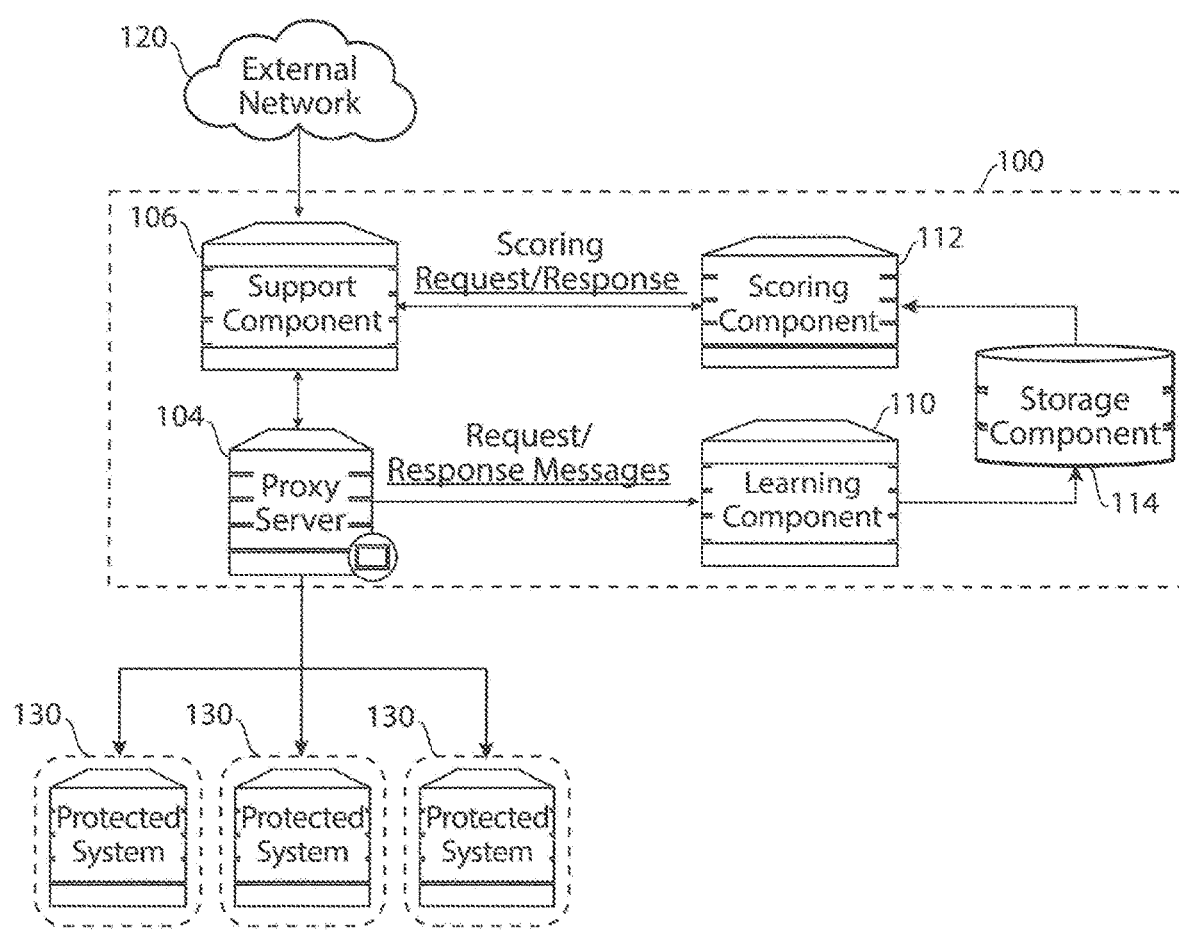
FIG. 1 illustrates a block diagram of an example network support system in a network environment, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 10 includes a network support system 100 that monitors communication to and from one or more protected systems 130 (referred to individually or collectively as protected system(s) 130). Components of the network support system 100 include a proxy server 104, a support component 106, a learning component 110, a scoring component 112, and a storage device 114. These components can communicate with one another in accordance with the methods described below, wherein the communication can be performed using wired and/or wireless communication links. Network support system 100 provides a support to a network service provided for or provided by a protected system 130.

The network service can be an external service, including an outgoing protected service provided by the respective protected systems 130 to the external network 120 or an incoming service from the external network 120 used by the protected systems 130. In still another scenario, the network service can be an internal network service used within the protected system 130. Non-limiting examples of incoming or outgoing external network services include internet access, an email service, a social media service, and a search engine. Non-limiting examples of internal network services include a document management service, a docketing service, and a billing management service.

The network support system 100 can provide support for managing one or more network services provided to or from one or more protected systems 130. Examples of support provided by the network support system 100 include mitigation of attack network traffic involved in the network service, policy enforcement for usage of the network service, and charge calculations for usage of the network service.

The network service to or from a protected system 130 can be compromised when the protected system 130 is under strain, also referred to as network strain. Network strain can be caused by an imbalance in network traffic volume and network resources of the protected system 130 for handling the network traffic. Such strain can be due to problems such as a network attack, a sudden rise in network traffic volume, or a depletion of network resources of the protected system 130, such as due to a malfunction. The effectiveness of the support for network services can be compromised when applied in the same way regardless of whether the network is experiencing network strain.

The learning component 110 observes network behavior during a learning phase when the network system 10 is not under strain and develops a model for the behavior based on observed network latency. The scoring component 110 compares current network behavior associated with real time operation to the model. When network strain is detected based on the comparison, the scoring component sends a request to the support component 106 to adjust its functionality as a function of the network strain. In this way, the support component 106 takes network strain into consideration when applying supports for providing the network service to or from protected system 130.

Network latency can by indicated by measurements such as roundtrip delay (RTD) or roundtrip time (RTT). The observed network latency can be an indicator of overall health of the protected system 130 receiving or providing the network service. In this way, the observed network latency serves as an early indicator of a distributed denial of service (DDOS) attack or other problems that cause an imbalance between network traffic volume and network resources.

By adjusting the support component 106 as a function of observed network strain, the support component 106 and the protected system 130 can remain functional for providing or using the network service, albeit temporarily in a degraded state until the protected system 130 is no longer under network strain.

For example, when the support component 106 provides mitigation for dropping network traffic to or from a protected system 130 when under network strain, the degree of mitigation can be adjusted based on the score determined by the scoring component 112. This can minimize mitigation when the score indicates that the network latency associated with the protected system 130 is above a threshold, but still relatively low, in order for the protected system 130 to remain functional for receiving or sending legitimate network traffic.

An example of policy enforcement support that can be provided by support component 106 includes source rate limiting protected services based on the score output by the scoring component 112. For example, a specified source can be allowed to make high latency service requests under a predetermined threshold. This would allow the network service to remain responsive and operative regardless of latency associated with requests per users of the specified source, so long as the user makes a reasonable amount of high latency requests.

An example of charge support that can be provided by support component 106 includes incurring a monetary charge based on the number of requests having a score above or below a predetermined threshold.

Furthermore, an example of support for policy enforcement, mitigation, or charge support that can be provided by support component 106 includes directing requests through alternative network infrastructure, such as to provide additional network analysis, e.g., by a scrubbing device, or provide cost savings by using slower, less expensive hardware infrastructure.

In this way, a DDOS attack or other source of network strain can be caught early without disabling the protected system 130 or network system 10. However, when the score indicates that the network latency is above a threshold and relatively high, the mitigation can be enlarged to block more network traffic, such as network traffic that may be associated with a large DDOS attack. Thus, depending on the size or stage of the DDOS attack, the mitigation applied by the support component 106 can allow the protected system 130 to remain operational, even if in a degraded state, until the DDOS attack can be remediated.

The protected systems 130 can each include one or more internally networked internal production systems (not shown). Each of protected systems 130 provide or receive the network service. The network service can operate by internal production systems of a protected system 130 receiving request messages and replying with response messages. The internal production systems within a protected system 130 can communicate with one another and/or with computing devices outside of the protected system 130 that are networked to an external network 120.

The internal production systems of each of the protected systems 130 can be provided at a single geographic location or can be distributed among multiple geographic locations that can be remote from one another. Examples of protected systems 130 include corporations that have multiple corporate offices, a university that can have multiple buildings and/or campuses, or a home network. Each protected network 130 can include, for example, a local access network (LAN), a wide access network (WAN), and/or a VPN. Examples of internal production systems include servers (e.g., web servers, bank servers, application servers, communication servers, name servers, file servers, etc.), desktop computers, laptop computers, mobile devices, etc.

The external network 120 itself is unprotected by the monitoring system 100. Rather, each protected system 130 is protected from communications received from the external network 120 or from botnets within the protected system 130. The external network 120 can include one or more networks, such as the Internet, an external VPN, etc. The external network 120 can include external hosts, such as servers, desktop computers, laptop computers, smart sensors, mobile device (cell phones, tablets, etc.).

The network support system 100 can be provided within or at the edge of the protected systems 130, in a public network, and/or can be deployed as a cloud-based server accessible via a network, such as the Internet, a public network, or a private network. The network support system 100 protects each of the protected systems 130 in accordance with the disclosed method. Accordingly, the service provided by each protected system is referred to as a protected service.

Proxy server 104, support component 106, learning component 110, and scoring component 112 each includes a computer system that executes software instructions to perform the method disclosed. Proxy server 104, support component 106, learning component 110, and/or scoring component 112 can share a computer system or certain hardware and/or software components a computer system, or each of proxy server 104, support component 106, and learning component 110 can use separate computer systems. The computer systems(s) used by the each of the proxy server 104, support component 106, learning component 110, and/or scoring component 112 can include a physical machine that is physically near the protected systems 130 and/or the other components of the proxy server 104, support component 106, learning component 110, and/or scoring component 112. Alternatively, any of these computer systems can be a virtual machine in which the programmable instructions are executed by a remote physical computing device. The disclosed system and method can be provided as a standalone product or as an added feature to an existing network support system that provides support to a protected system and has access to both request and response messages sent to or from the protected system.

In the example shown in FIG. 1, network traffic from external network 120 flows through support component 106, such as for applying mitigation, policies, or determining charges, after which the network traffic flows through proxy server 104. In the reverse direction, network traffic from protected systems 130 flows through proxy server 104 and then through support component 106. In one or more embodiments, the positions of the support component 106 and proxy server 104 can be reversed with respect to the flow of network traffic.

The proxy server 104 acts as a proxy for each of protected systems 130 and sends all request and response messages to or from the protected system 130 for analysis by the learning component 110 during a learning phase when the network system is not exposed to network strain. In one or more embodiments, the learning component 102 can operate during an analysis phase during actual network system operation in real time, such as to recognize indications of network strain while occurring.

When operating in the learning phase, the learning component 110 trains an unsupervised machine-learning model to cluster like requests and generate baseline, learned clusters and learned histograms as indicators of healthy traffic patterns exhibited by the protected service.

Storage component 114 communicates by one or more wired or wireless communication links with learning component 110 and scoring component 112. Storage component 114 includes at least one storage medium for storing the learned clusters and learned histograms received from the learning component 110. Scoring component 112 can access the learned clusters and learned histograms, such as for comparing requests received from support component 106 to the learned clusters and/or learned histograms.

The learning phase uses the following method during sample operation of the network system 100 when the network system 100 is operating free from DDOS attacks or strain. The learning component 110 receives request and response messages from the proxy server 104. The request and response messages can be logged or streamed messages that include fields, such as example fields shown in Tables 1 and 2. Alternatively, request and response messages received during the learning phase can further include optional fields, as shown in Table 3 (wherein Table 3 shows the fields as normalized).

TABLE 1

Request Fields

| Field | Description |
| --- | --- |
| UID | Unique Identifier (SHA-1) |
| Timestamp | Unix Timestamp |
| Destination IP | IP Address |
| HTTP Method | GET, PUT, PATCH, etc. |
| HTTP URL | Uniform Resource Locator |
| HTTP Body Size | Non-Negative Integer |

TABLE 2

Response Fields

| Field | Description |
| --- | --- |
| UID | Unique Identifier (SHA-1) |
| Round-Trip Delay (RTD) | Positive Integer |
| HTTP Status | 200, 404, 500, etc. |
| HTTP Size | Non-Negative Integer |
| HTTP Type | MIME Type |

TABLE 3

Optional Fields

| Field | Normalization Method |
| --- | --- |
| RTD | RTD/max RTD |
| HTTP Status | avg code RTD/max RTD |
| HTTP Size | size/max HTTP size |
| HTTP Type | avg type RTD/max RTD |

Learning component 110 normalizes each of the fields in the messages, such as in accordance with the example normalization equations shown in Table 4.

TABLE 4

Normalized Fields

| Field | Normalization Method |
| --- | --- |
| Destination IP | (ping ms + # hops ˆ 2)/max |
| HTTP Method | avg method RTD/max RTD |
| HTTP URL | avg path RTD/max RTD |
| HTTP Body Size | body size/max RTD |

The learning phase is performed in iterations, each iteration corresponding to a selected time interval (e.g., without limitation, one hour). Received request and response messages are buffered for the time interval, after which they are processed together, allowing for a sufficiently large number of events (request and message pairs) to be processed at the same time. In the example shown, destination IP is normalized by a term max, which refers to the maximum value determined for the equation (ping ms+#hops^2) for the particular destination IP address. This term max can be updated as additional network traffic is received during the learning phase over a large number of intervals.

HTTP method, uniform resource locator (URL), and body size are each normalized over a term maximum return time delay (max RTD). Max RTD can be determined manually or calculated during each iteration of the learning phase based on the maximum RTD of network traffic received during the iteration. Max RTD can further be adjusted by adding a configurable amount of headroom. While both request messages and response messages are normalized using the same max RTD, max RTD is calculated based on the maximum return time value associated with the response messages. Max RTD can be updated as network traffic is received during the learning phase, over a large number of intervals. Network traffic acquired over a large number of intervals is used since Max RTD is effectively determined once a sufficiently large number of response messages have been received.

The learning component 110 clusters the request messages using an unsupervised algorithm, such as KMeans, DBSCAN, Self Organizing Map (SOM), etc. Once clustered, the response messages in each cluster are used to score the cluster based on a network delay associated with the response, e.g., RTD. The score is determined using statistical functions such as, and without limitation, maximum, median, mean, standard deviation (SD), median absolute deviation (MAD), percentiles, etc. These scores are added to learned cluster-specific histograms for each statistical function used. For example, each cluster can have multiple histograms, such as a maximum histogram, a median histogram, an SD histogram, a MAD histogram, and a percentiles histogram. The learned histograms are used to measure the behavior of each of the clusters with regard to their RTD over time when operating under normal conditions without threat of an attack.

The learning phase can include multiple iterations. Iterations can be repeated at selected short time intervals, such as one-minute intervals. Each iteration can be performed using a streaming time window that has a longer time interval, such as a one-hour interval. In this example, a new one-hour interval would be processed for updating the histograms every minute. The disclosure is not limited to a particular short or longer time interval.

Once the learning phase is completed and a model is available that includes the learned clusters and learned histograms, a scoring phase can begin. During the scoring phase, the support component 106 selects a network service request to be scored and submits fields of the selected network service request in a score request to the scoring component 112. The network service request can either be a request submitted by the protected systems 130 for an incoming service from the external network 120, a request submitted by the protected systems 130 for an internal service provided by another protected system 130, or a request from the external network 120 to the protected systems 130 for an outgoing protected service provided by one of the protected systems 130. The support component 106 can select the network service requests at regular or random intervals or based on a condition. The condition can be related to network performance or receipt of a user request from an administrator.

Provided that the model of learning clusters and learning histograms has been developed during the learning analysis, the scoring component scoring component 112 normalizes the fields included with the score request. The normalization process can be similar to the normalization used during the learning phase.

The scoring component 112 compares the normalized score request fields to the learned clusters for classifying the score request as being most similar to one of the learned clusters. The classification process can use, for example, a k-nearest neighbor algorithm to select a learned cluster to which it matches, meaning to which it is sufficiently similar. If no matching cluster is found, the scoring component 112 responds to the score request to indicate that a matching cluster is unknown. The scoring component 112 calculates a score based on the learned histograms generated for the matching learned cluster. The score represents a percentile calculated for the statistical values of the matching learned cluster that are closest to the normalized fields of the score request, which in turn further represents a degree of strain the network service request is putting on the network system 10.

A higher score can indicate that the network service request is putting a high degree of strain on the network and is a good candidate to be treated as attack or high-maintenance traffic. A lower score can indicate that the network service request is not exerting much strain, if any, on the network and should be treated as legitimate or low-maintenance traffic. The scoring component 112 outputs the calculated score as a response to the score request.

The support component 106 can decide to treat the request based on the score. For example, when the support component 106 provides mitigation, the support component 106 may drop only requests that have a score above a predetermined threshold. In another example, the support component may decide to drop a percentage of requests that have a score within a predetermined range. When the support component 106 provides policy enforcement or calculates charges for use of the network service, it may apply different policies for or charges based on the score.

Figure 2:
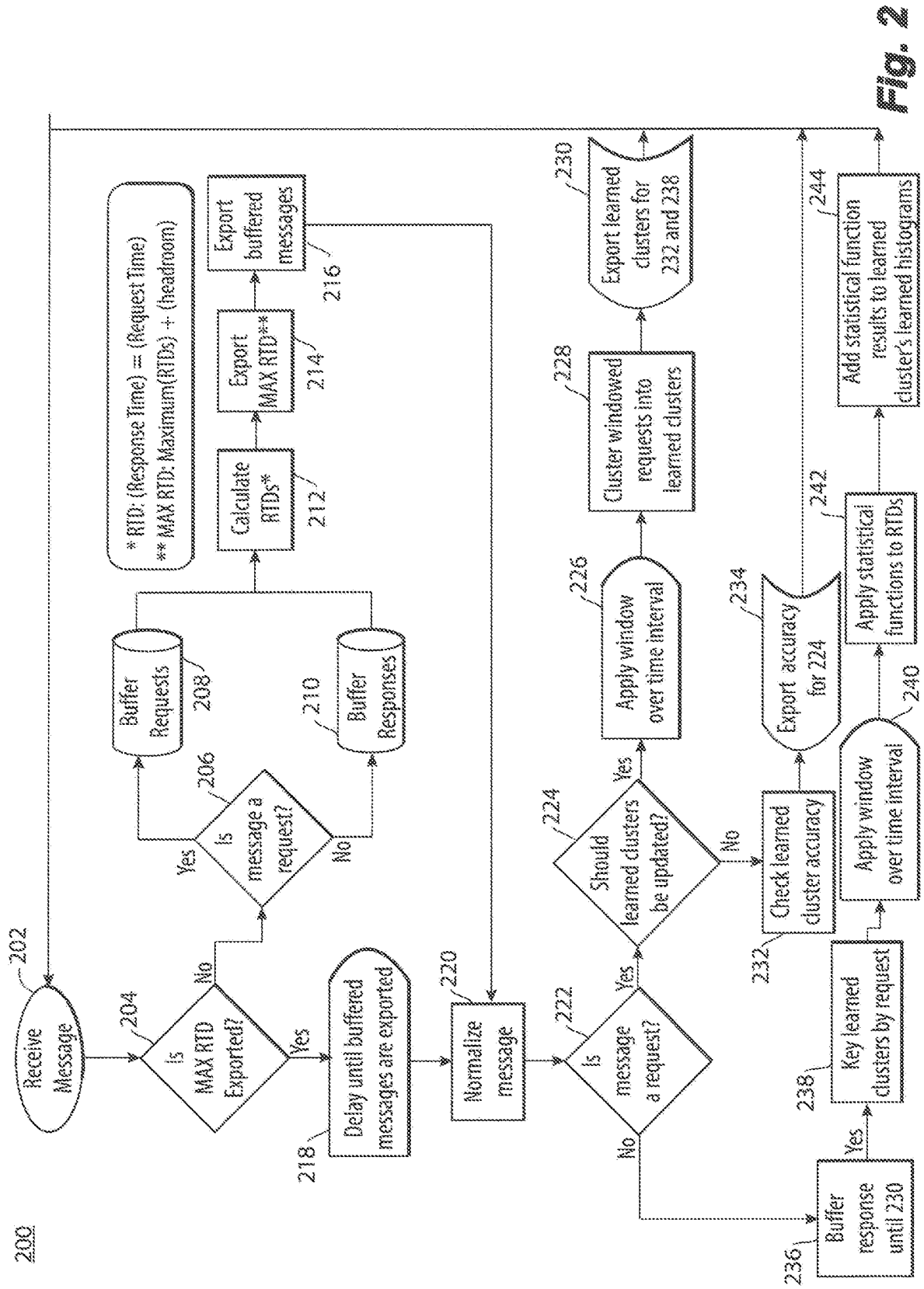
FIG. 2 illustrates a flowchart showing an example method performed by a learning component of the network support system during a learning phase, in accordance with embodiments of the disclosure.
Figure 3:
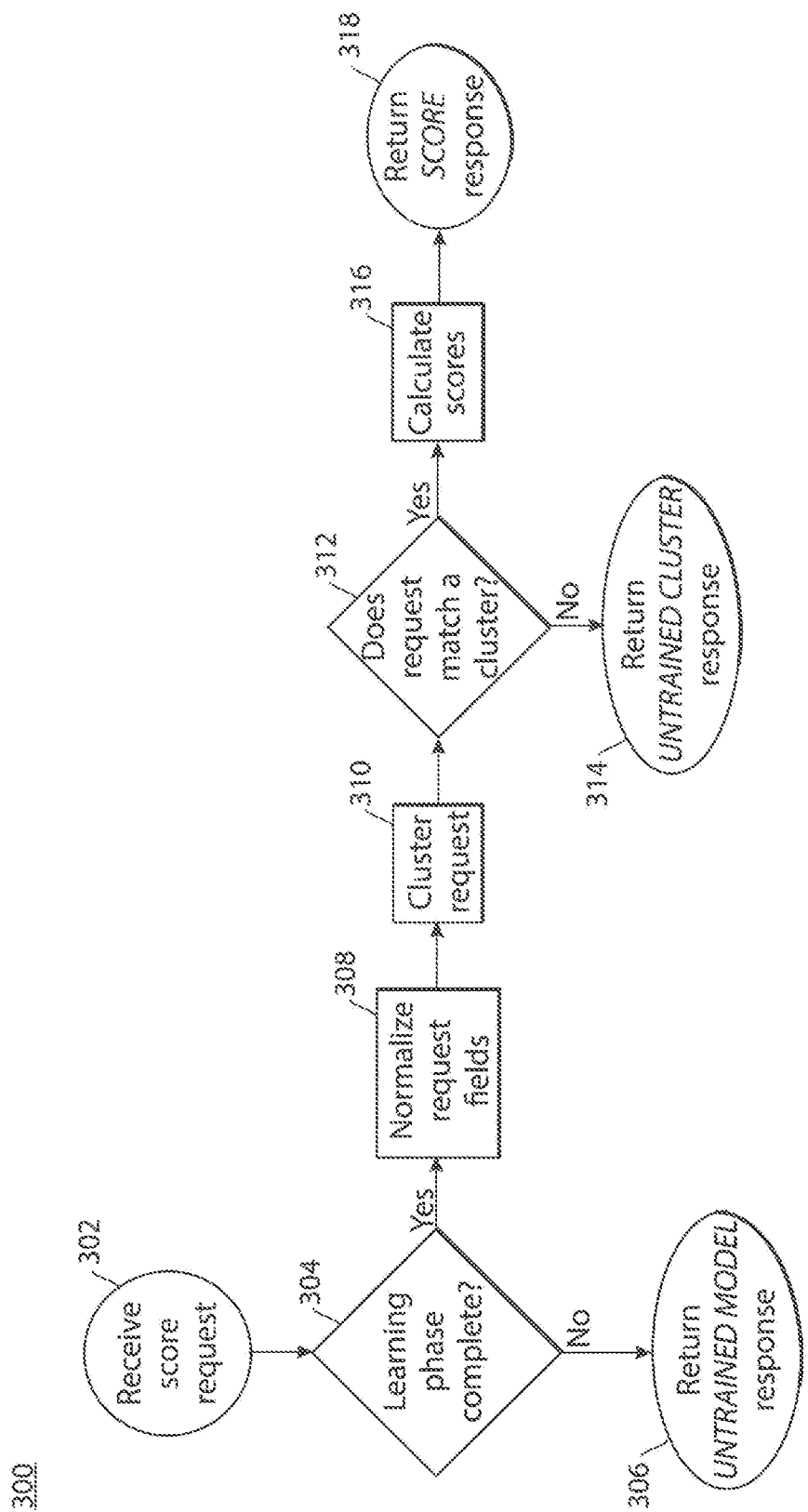
FIG. 3 illustrates a flowchart showing an example method performed by a scoring component of the network support system during a scoring phase, in accordance with embodiments of the disclosure.

With reference now to FIGS. 2 and 3, shown are flowcharts demonstrating example implementation of the various exemplary embodiments. It is noted that the order of blocks shown in FIGS. 2 and 3 is not required, so in principle, the various blocks may be performed out of the illustrated order or in parallel. Also certain blocks may be skipped, different blocks may be added or substituted, or selected blocks or groups of blocks may be performed in a separate application following the embodiments described herein.

FIG. 2 illustrates a flowchart 200 that shows an example method performed by a stream analyzer during a learning phase for developing a learned model, such as stream analyzer 102 shown in FIG. 1. The learning phase trains an unsupervised machine learning model to cluster like request messages and generate a representation of baseline behavior of traffic patterns of the a protected system, such as protected systems 130 shown in FIG. 1. At block 202, a message of learning network traffic is received, e.g., via a proxy server, such as proxy server 104 shown in FIG. 1. The message can be received in real time, or from a log of messages, as the network is in operation in the learning phase is a safe environment in which the network system is not exposed to attacks.

At block 204, a determination is made whether Max RTD has been exported for the current interval. If the determination at block 204 is NO, meaning Max RTD has not been exported yet, the method continues at block 206, else if the determination at block 204 is YES, meaning Max RTD has already been exported, the method continues at block 218.

At block 206, a determination is made whether the message is a request. If the determination at block 206 is YES, meaning the message is a request, the method continues at block 208, else if the determination at block 206 is NO, meaning the message is not a request, the method continues at block 210. At block 208, the message is buffered with requests and the method continues at block 212. At block 210, the message is buffered with responses and the method continues at block 212. At block 212, RTDs are calculated for each of the request response pairs based on Equation (1) below:

$$RTD = \text{Response Time} - \text{Request Time} \qquad \text{Equation (1)}$$

At block 214, Max RTD is updated if appropriate based on Equation (2) below, and the updated Max RTD is exported.

$$\text{Max RTD} = \text{Maximum(RTDs)} + (15\% \text{ headroom}) \qquad \text{Equation (2)}$$

The method continues at block 216. At block 216, the buffered messages are exported and the method continues at block 220. At block 218, the method delays by waiting a period of time sufficient for the buffered messages to be exported at block 216.

The method continues at block 220. At block 220, the message received at block 202 is normalized, such as using normalization methods shown in Tables 3 and 4. At block 222 a determination is made whether the message received at block 202 is a request. If the determination at block 222 is YES, meaning the message is a request, the method continues at block 224, else if the determination at block 222 is NO, meaning the message is not a request, the method continues at block 236.

At block 224, a determination is made whether clusters of the model should be updated. If the determination at block 224 is YES, meaning the clusters should be updated, the method continues at block 226, else if the determination at block 224 is NO, meaning the clusters do not need to be updated, the method continues at block 232.

At block 226, a window is applied over a time interval. At block 228, the request messages within the window (referred to as windowed requests) are clustered into learned clusters. Clustering is performed based on the normalized values associated with the fields of the request messages, such as using an unsupervised algorithm, e.g., KMeans, DBSCAN, Self Organizing Map (SOM), etc. At block 230, the learned clusters are exported for use by blocks 232 and 238. The method continues at block 202 to wait for arrival of a next message.

At block 232, the learned clusters are checked for accuracy. At block 234, the accuracy determined at block 232 is exported to block 224 to be used for making its determination. The method continues at block 202 to wait for arrival of a next message.

At block 236, the response received at block 202 is buffered with a delay sufficient for block 230 to be performed. This response is buffered until the request messages can be used to export the clusters at block 230. At block 238, the learned clusters are keyed by request, meaning the response messages are correlated with the learned clusters to which their corresponding responses have been clustered. At block 240, a window is applied over a time interval, with the window ending at the moment the method proceeds from block 240 to 242. At block 242, statistical functions are applied for the window applied to the RTDs for the responses associated with each learned cluster. A result of the statistical function for each learned cluster is used to assign a score to the learned cluster. At block, 244 the scores determined at block 242 are added to learned histograms for each learned cluster to update each learned histogram based on revisions to the learned clusters and the RTDs for each learned cluster over the window applied. The method continues at block 202 to wait for arrival of a next message.

In one or more embodiments, instead of using blocks 204, 206, 208, 210, 212, and/or 214 to determine Max RTD, Max RTD can be determined and/or configured manually.

FIG. 3 illustrates a flowchart 300 that shows an example method performed by a scoring component during a scoring phase, such as scoring component 112 shown in FIG. 1. During the scoring phase, using a model based on the learned clusters and learned histograms developed during the learning phase, a score can be generated in response to a score request. At block 302 a score request is received from a support component, such as support component 106, shown in FIG. 1. At block 304 a determination is made whether the learning phase, such as the learning phase performed in FIG. 2, is complete. If the determination at block 304 is NO, meaning the learning phase has not yet been completed, then an error response is sent to the score request indicating that the model is still untrained and not ready to be used. If the determination at block 304 is YES, meaning the learning phase is complete, the method continues at block 308 in which fields of the score request are normalized. The normalization process can be similar to the normalization of the request fields performed at block 220 shown in FIG. 2.

At block 310, the normalized score request fields are compared to the fields of the learned clusters for classifying the score request. At block 312, a determination is made whether there is a learned cluster to which the score request can be classified, meaning fields associated with the learned cluster are sufficiently similar to the normalized fields of the score request. If the determination at block 312 is NO, meaning that a learned cluster to which the score request can be classified is not known (i.e., was not found), a response to the score request is output that indicates that the learned cluster for the score request is unknown. Otherwise, if the determination at block 312 is YES, meaning that a learned cluster to which the score request can be classified was found (also referred to as a matching learned cluster), at block 316 a score is calculated based on the histograms generated for the matching learned cluster. More specifically, the score represents a percentile calculated for the statistical values of the matching learned cluster that are closest to the normalized fields of the score request. At block 318, the score is returned as a response to the score request.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments performed by the network support system 100 may be implemented or executed by one or more computer systems. For example, processing performed by proxy server 104, support component 106, learning component 110, and/or scoring component 112, can be implemented using one or more computer systems, such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
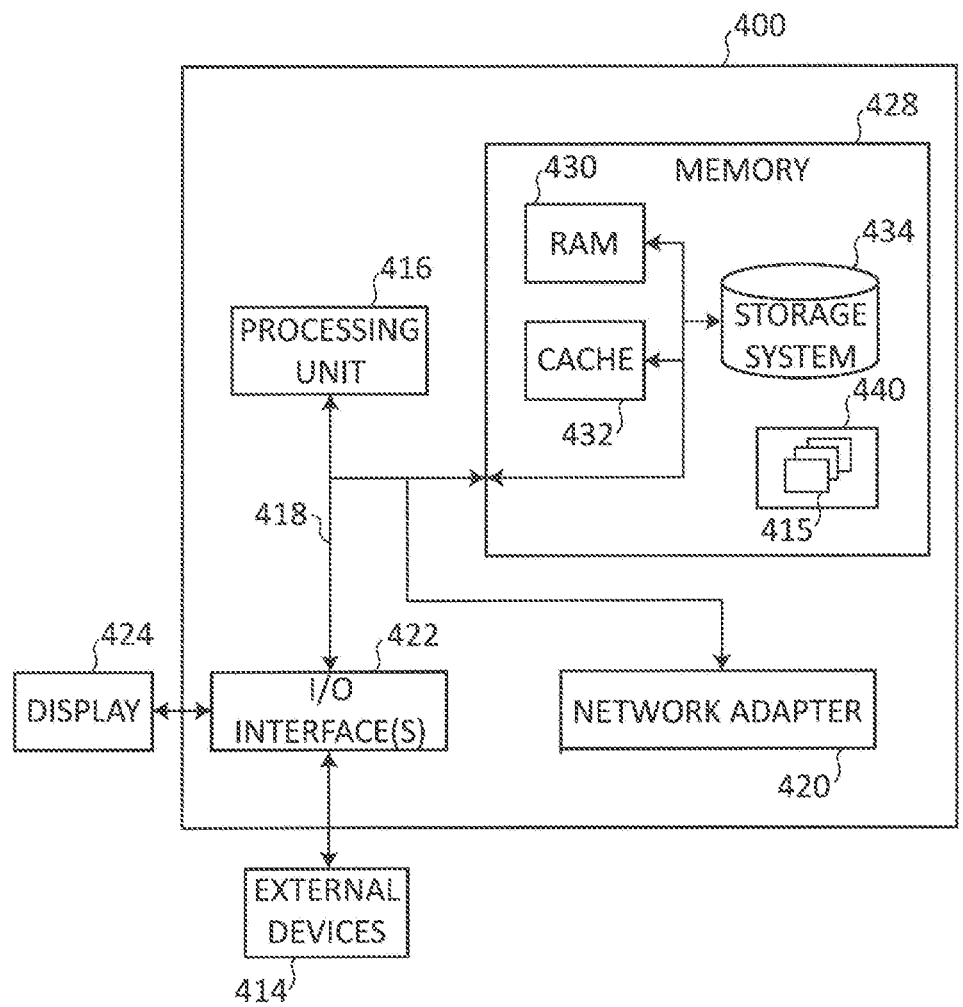
FIG. 4 illustrates a schematic block diagram of an example computer system used by the network support system, in accordance with an illustrative embodiment of the present disclosure.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by components of the network support system 100, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415 may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable components of the network support system 100 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of the network support system 100 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system includes the ability to detect strain on a protected network regardless of the cause, and request mitigation in a timely fashion while the protected network is still operational. In this way, the protected network can continue to be operational while the mitigation is applied, even with degraded functionality.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed:

1. A method of monitoring a protected network, the method comprising:
in a scoring phase:
receiving a learned model having multiple clusters of learning requests of learning network traffic, wherein the learning requests are clustered according to fields of each of the learning requests, the learning network traffic is network traffic observed during a learning phase during non-strain operation of the protected network, the learning requests are requests for a network service sent to or from the protected system, and each cluster has a least one associated statistical characteristic of learning response time based on learning response times determined for learning requests and corresponding learning responses of the learning network traffic;
receiving a score request to score a network service request of the network traffic, wherein the network service request is associated with a network service provided to or from the protected network and the score request includes fields of the network service request;
classifying the network service request with one of the multiple clusters by comparing the fields of the network service request to the fields used for clustering the learning requests with the cluster, wherein the network service request is classified regardless of whether the network service request is potentially associated with a cause of strain on the protected network;
calculating a score that represents behavior associated with the network request based on the at least one characteristic of learning response time generated for the learned cluster to which the network service request is classified; and
adjusting supportive handling of the network service request based on the score.

2. The method of claim 1, further comprising:
in the learning phase during non-strain operation of the protected network:
observing the learning network traffic;
clustering the learning requests based on the respective learning requests' fields;
associating one of the learning responses or lack of learning response to each corresponding learning request of the clusters;
determining the learning response time for the respective learning responses; and
determining the characteristic of learning response time per cluster based on the learning response times of the learning responses that correspond to the learning requests associated with the cluster.

3. The method of claim 1, further comprising:
normalizing selected fields of each learning request before clustering the learning requests using the normalized selected fields; and
normalizing the fields of the network service request before classifying the network service request.

4. The method of claim 1, further comprising:
normalizing selected fields of each of the learning responses before clustering the learning requests using the normalized selected fields.

5. The method of claim 3, further comprising determining a maximum return time, wherein the selected fields of the learning requests and requests are normalized using the maximum return time.

6. The method of claim 1, wherein the characteristic of learning response time is based on at least one statistical function determined using the response times associated with the cluster, the method further comprising: and at least one learned histogram including a learned histogram per statistical function determined for the cluster, wherein the learned histogram represents behavior of the cluster with regard to learning response times over time, wherein the method further comprises determining for the behavior associated with the network request a percentile for values of the statistical function that corresponds to each histogram, wherein calculating the score is based on the percentile determined for the respective histograms.

7. The method of claim 1, wherein the supportive handling includes dropping or redirecting network service requests, and adjusting the supportive handling includes deciding whether to drop or redirect the network service request based on the score.

8. The method of claim 1, wherein the supportive handling includes applying policy or charges, and adjusting the supportive handling includes selecting application of policy or charges based on the score.

9. A network monitoring system to monitor a protected network for strain, the network monitoring system comprising:
a memory configured to store instructions; and
a processor disposed in communication with the memory, wherein the processor, upon execution of the instructions is configured to:
in a scoring phase:
receive a learned model having multiple clusters of learning requests of learning network traffic, wherein the learning requests are clustered according to fields of each of the learning requests, the learning network traffic is network traffic observed during a learning phase during non-strain operation of the protected network, the learning requests are requests for a network service sent to or from the protected system, and each cluster has a least one associated statistical characteristic of learning response time based on learning response times determined for learning requests and corresponding learning responses of the learning network traffic;
receive a score request to score a network service request of the network traffic, wherein the network service request is associated with a network service provided to or from the protected network and the score request includes fields of the network service request;
classify the network service request with one of the multiple clusters by comparing the fields of the network service request to the fields used for clustering the learning requests with the cluster, wherein the network service request is classified regardless of whether the network service request is potentially associated with a cause of strain on the protected network; and
calculate a score that represents behavior associated with the network request based on the at least one characteristic of learning response time generated for the learned cluster to which the network service request is classified; and
adjust supportive handling of the network service request based on the score.

10. The network monitoring system of claim 9, further comprising, the processor upon execution of the instructions further configured to:

in a learning phase during non-strain operation of the protected network:
    observe the learning network traffic;
    cluster the learning requests based on the respective learning requests' fields;
    associate one of the learning responses or lack of learning response to each corresponding learning request of the clusters;
    determine the learning response time for the respective learning responses; and
    determine the characteristic of learning response time per cluster based on the learning response times of the learning responses that correspond to the learning requests associated with the cluster.

11. The network monitoring system of claim 9, wherein the processor upon execution of the instructions further configured to:
    normalize selected fields of each learning request before clustering the learning requests using the normalized selected fields; and
    normalize the fields of the network service request before classifying the network service request.

12. The network monitoring system of claim 9, wherein the processor upon execution of the instructions further configured to normalize selected fields of each of the learning responses before clustering the learning requests using the normalized selected fields.

13. The network monitoring system of claim 11, wherein the processor upon execution of the instructions further configured to determine a maximum return time, wherein the selected fields of the learning requests and requests are normalized using the maximum return time.

14. The network monitoring system of claim 9, wherein the characteristic of learning response time is based on at least one statistical function determined using the response times associated with the cluster and at least one learned histogram including a learned histogram per statistical function determined for the cluster, wherein the learned histogram represents behavior of the cluster with regard to learning response times over time, wherein the processor upon execution of the instructions further configured to determine for the behavior associated with the network request a percentile for values of the statistical function that corresponds to each histogram, wherein calculating the score is based on the percentile determined for the respective histograms.

15. The network monitoring system of claim 9, wherein the supportive handling includes dropping or redirecting network service requests, and adjusting the supportive handling includes deciding whether to drop or redirect the network service request based on the score.

16. The network monitoring system of claim 9, wherein the supportive handling includes applying policy or charges, and adjusting the supportive handling includes selecting application of policy or charges based on the score.

17. A non-transitory computer readable storage medium and one or more computer programs stored therein, the computer programs comprising instructions, which when executed by a computer system, cause the computer system to:
    in a scoring phase:
        receive a learned model having multiple clusters of learning requests of learning network traffic, wherein the learning requests are clustered according to fields of each of the learning requests, the learning network traffic is network traffic observed during a learning phase during non-strain operation of the protected network, the learning requests are requests for a network service sent to or from the protected system, and each cluster has a least one associated statistical characteristic of learning response time based on learning response times determined for learning requests and corresponding learning responses of the learning network traffic;
        receive a score request to score a network service request of the network traffic, wherein the network service request is associated with a network service provided to or from the protected network and the score request includes fields of the network service request;
        classify the network service request with one of the multiple clusters by comparing the fields of the network service request to the fields used for clustering the learning requests with the cluster, wherein the network service request is classified regardless of whether the network service request is potentially associated with a cause of strain on the protected network; and
        calculate a score that represents behavior associated with the network request based on the at least one characteristic of learning response time generated for the learned cluster to which the network service request is classified; and
        adjust supportive handling of the network service request based on the score.

18. The non-transitory computer readable storage medium of claim 17, wherein the computer system, upon execution of the instructions, is further caused to, in a learning phase during non-strain operation of the protected network:
    observe the learning network traffic;
    cluster the learning requests based on the respective learning requests' fields;
    associate one of the learning responses or lack of learning response to each corresponding learning request of the clusters;
    determine the learning response time for the respective learning responses; and
    determine the characteristic learning response time per cluster based on the learning response times of the learning responses that correspond to the learning requests associated with the cluster.

19. The non-transitory computer readable storage medium of claim 17, wherein the supportive handling includes dropping or redirecting network service requests, and adjusting the supportive handling includes deciding whether to drop or redirect the network service request based on the score.

20. The non-transitory computer readable storage medium of claim 17, wherein the supportive handling includes applying policy or charges, and adjusting the supportive handling includes selecting application of policy or charges based on the score.

* * * * *